(12) United States Patent
Mueck et al.

(10) Patent No.: US 10,581,510 B2
(45) Date of Patent: Mar. 3, 2020

(54) NETWORK CONTROLLER AND METHOD FOR CONTROLLING A COMMUNICATION

(71) Applicant: Intel Corporation, Santa Clara, CA (US)

(72) Inventors: Markus Dominik Mueck, Neubiberg (DE); Reza Arefi, Great Falls, VA (US); Madhusudana Raghupatruni, Bangalore (IN); Punit Rathod, Bangalore (IN); Srikathyayani Srikanteswara, Portland, OR (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 15/700,205

(22) Filed: Sep. 11, 2017

(65) Prior Publication Data

US 2019/0081690 A1 Mar. 14, 2019

(51) Int. Cl.
| | |
|---|---|
| H04B 7/08 | (2006.01) |
| H04B 17/345 | (2015.01) |
| H04B 7/06 | (2006.01) |
| H04W 52/24 | (2009.01) |
| H04W 52/14 | (2009.01) |
| H04W 52/42 | (2009.01) |
| H04B 1/10 | (2006.01) |
| H04L 25/03 | (2006.01) |
| H04W 52/28 | (2009.01) |

(52) U.S. Cl.
CPC .......... *H04B 7/086* (2013.01); *H04B 7/0617* (2013.01); *H04B 17/345* (2015.01); *H04W 52/146* (2013.01); *H04W 52/243* (2013.01); *H04W 52/42* (2013.01); *H04B 1/1027* (2013.01); *H04L 25/0328* (2013.01); *H04W 52/283* (2013.01)

(58) Field of Classification Search
CPC ..... H04B 7/086; H04B 17/345; H04B 7/0617
See application file for complete search history.

(56) References Cited

U.S. PATENT DOCUMENTS

| | | | |
|---|---|---|---|
| 6,400,927 B1 * | 6/2002 | Daniel | H04B 7/18513 370/316 |
| 6,449,461 B1 * | 9/2002 | Otten | H04W 16/14 455/63.1 |
| 6,628,921 B1 * | 9/2003 | Vaddiparty | H04B 7/1851 455/12.1 |
| 10,116,381 B1 * | 10/2018 | Smyth | H04W 52/242 |
| 10,165,452 B2 * | 12/2018 | Ramamurthi | H04W 16/28 |

(Continued)

OTHER PUBLICATIONS

Federal Communications Commission, "Report and Order and Second Further Notice of Proposed Rulemaking", Adopted: Apr. 17, 2015, Released: Apr. 21, 2015, FCC 15-47.

(Continued)

*Primary Examiner* — David Bilodeau

(57) ABSTRACT

According to various examples, a network controller is described comprising a determiner configured to determine, based on an elevation angle of a direction of a communication between a first communication device and a second communication device, a risk of interference to a third communication device by the communication and a controller configured to control the communication between the first communication device and the second communication device based on the determined risk.

18 Claims, 10 Drawing Sheets

(56) References Cited

U.S. PATENT DOCUMENTS

| | | | | |
|---|---|---|---|---|
| 2011/0212695 A1* | 9/2011 | Wild | ................. | H01Q 3/26 |
| | | | | 455/73 |
| 2015/0236772 A1* | 8/2015 | Hammarwall | ....... | H04B 7/0617 |
| | | | | 370/329 |
| 2016/0127920 A1* | 5/2016 | Thomas | ............... | H04B 7/0617 |
| | | | | 455/446 |

OTHER PUBLICATIONS

Radio Spectrum Policy Group 2011, "Report on Collective Use of Spectrum (CUS) and other spectrum sharing approaches", Nov. 2011, pp. 1-38, RSPG11-392 Final.

ETSI, "Electromagnetic compatibility and Radio spectrum Matters (ERM); System Reference document (SRdoc); Mobile broadband services in the 2 300 MHz-2 400 MHz frequency band under Licensed Shared Access regime", Technical Report, Jul. 2013, ETSI TR 103 113, V1.1.1, ETSI, France.

Federal Communications Commission, "Notice of Proposed Rulemaking and Order", Dec. 12, 2012, FCC 12-148, retrieved from [https://www.fcc.gov/document/enabling-innovative-small-cell-use-35-ghz-band-nprm-order].

* cited by examiner

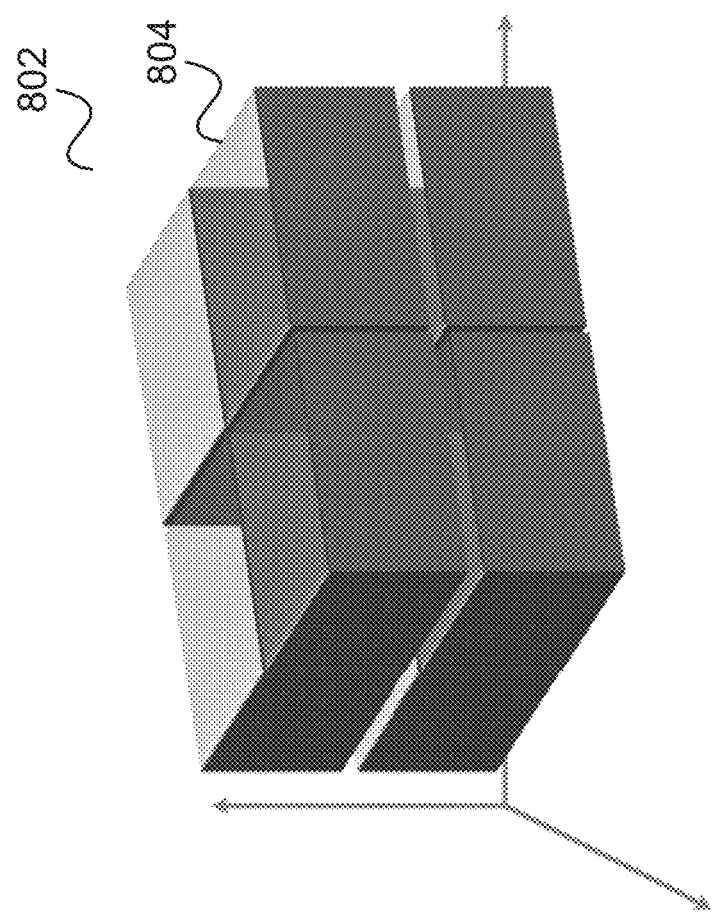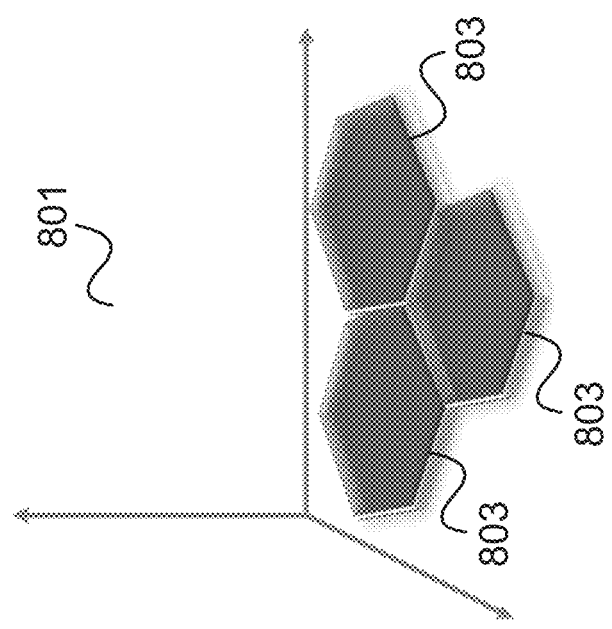
FIG 8

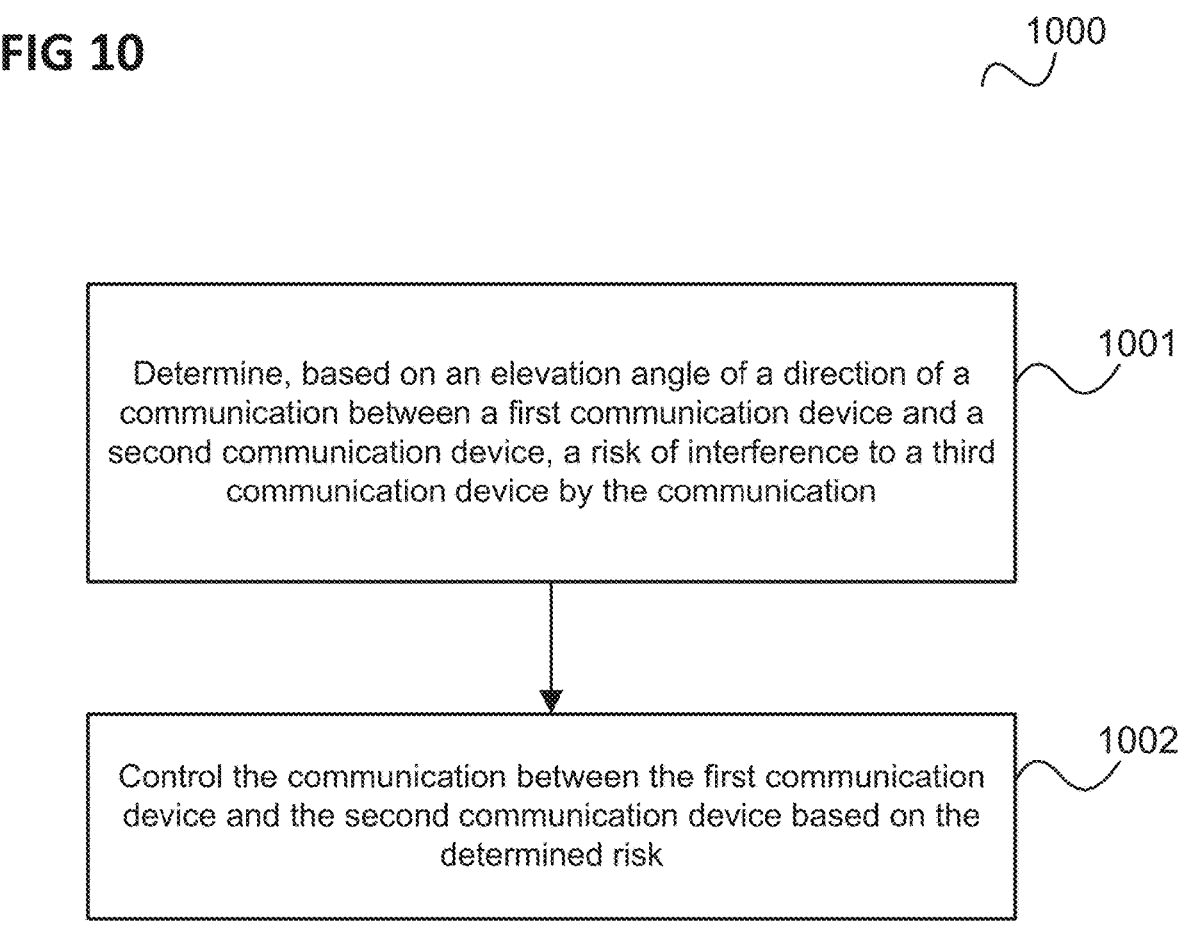

US 10,581,510 B2

NETWORK CONTROLLER AND METHOD FOR CONTROLLING A COMMUNICATION

TECHNICAL FIELD

Exemplary implementations described herein generally relate to a network controller and a method for controlling a communication.

BACKGROUND

SAS (Spectrum Access System) based spectrum sharing in 3.5 GHz has been introduced by the FCC (Federal Communications Commission). In this context, a central SAS (Spectrum Access System) controller is introduced with which all CBSDs (citizens' broadband radio service devices e.g. base stations, small cells, access points, etc.) need to establish a context. This central SAS controller is mainly used for incumbent protection and long-term spectrum allocation. However, a traditional SAS system is not suitable for taking into account protection of satellites and therefore has the potential to create substantial interference to satellites. Therefore, approaches to avoid interference to satellites in such a context are describable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 8 illustrates 3-D spectrum sharing in comparison to 2-D spectrum sharing.

FIG. 10 shows a flow diagram illustrating a method for controlling a communication, for example performed by a network controller.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The FCC released a Report and Order on Apr. 17, 2015 outlining the rules for operating wireless devices in the 3.5 GHz band that spans from 3550-3700 MHz. FCC released this spectrum for sharing with the incumbents by giving the incumbents priority over new broadband services in that band and it can be used by broadband devices when (and where) incumbents are not using the spectrum. The incumbents (referred to as tier 1 users) in this band include DoD (Department of Defense) radars. There are two additional tiers of spectrum users in addition to the incumbents namely the Priority Access Layer (PAL), or tier 2, and General Authorized Access (GM), or tier 3. The PAL users get protection from users in GM, which is similar to unlicensed spectrum.

Figure 1:
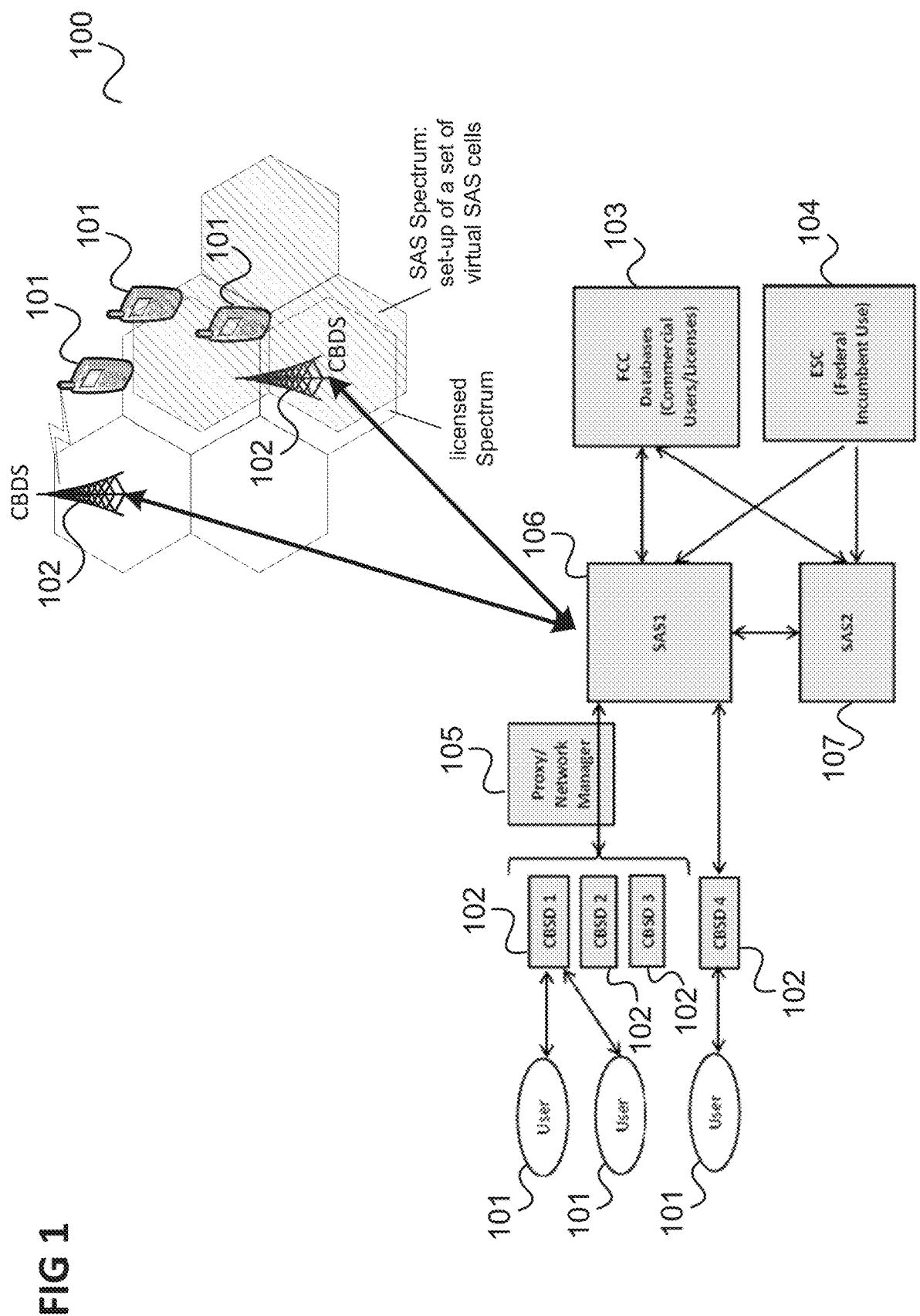
FIG. 1 shows a communication system having the FCC Spectrum Access System (SAS) Architecture.

The FCC also mandates a Spectrum Access System (SAS) that coordinates the spectrum sharing between the incumbents, PAL and GM. The SAS is central to this band, and no tier 2 or tier 3 device can operate unless it is in constant communication with the SAS and receives information on when and where to use the 3.5 GHz channels. A SAS has to be approved by the FCC before it can be deployed. Since the SAS is the central coordinator for this spectrum, it needs to have sufficient information about the network and devices. In fact, FCC mandates most of this information to be contained in the SAS. FCC's Report and Order outlines a sample system with SAS(s) as shown in FIG. 1. If there are multiple SASs, they are supposed to be synchronized with each other. However, the FCC does not specify details of how the SAS have to be implemented and what information has to be synchronized.

FIG. 1 shows a communication system 100 having the FCC Spectrum Access System (SAS) Architecture.

The communication system 100 includes a plurality of user terminals 101, e.g. subscriber terminals such as user equipments (UEs), which are served by citizens' broadband radio service devices (CBSDs) 102, i.e. radio access nodes such as base stations, e.g. NodeBs or eNodeBs, small cells or access points. The CBSDs 102 assign to the end users, i.e. their user terminals 101, the available frequencies to promote efficient and flexible use of the spectrum access. These data are used to design a centralized long-term cycle time information flow from SAS entities to CBSDs 102.

According to SAS, there are three levels of user priorities:
i) Tier 1 users (Incumbents) have priority over all other Tiers,
ii) Tier 2 users (Priority Access License (PAL) users) have priority over Tier 3 users in PAL bands, they need to acquire usage rights for these bands through auctioning and
iii) Tier 3 users (General Authorized Access (GM) users) have the lowest level of priority. PALs are typically are building on licensed band technologies with an additional feature to interact with the SAS node. Still, an unlicensed band system could theoretically also be employed with the additional feature to interact with the SAS node.

The candidate communication systems which may be used for a licensed band or unlicensed band system or technology, i.e. according to which a communication device (e.g. according to the following examples, such as the first communication device and the second communication device in the examples below) may operate, include but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

It should further be noted that the schemes and approaches described in the following can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). It can be applied to other bands, including mmWave (millimetre wave) bands. Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the schemes and approaches described in the following can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

It should further be noted that a hierarchical application of the scheme and approaches described in the following is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. The schemes and approaches of the following examples can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

An FCC database 103 provides information about registered or licensed commercial users in a band.

An ESC (Environmental Sensing Capability) 104 provides information about incumbents of a band. Through a proxy (network manager) 105 SAS controllers 106, 107 interact with information derived from the FCC database 103 and the ESC 104 with CBSDs 102 in a direct or indirect way. This ensures that CBRS users operate in a consistent manner with their authorizations. The SAS controllers 106, 107 can verify the efficient utilization of the band. The end user devices 101 controlled by an authorized CBSD 102 have the capability to communicate with a CBSD 102. CBSDs 102 are e.g. access points which allow the communication/coordination with a SAS controller 106, 107 and the end users respectively. On the CBSD side a distributed channel access with different technologies is used.

Figure 2:
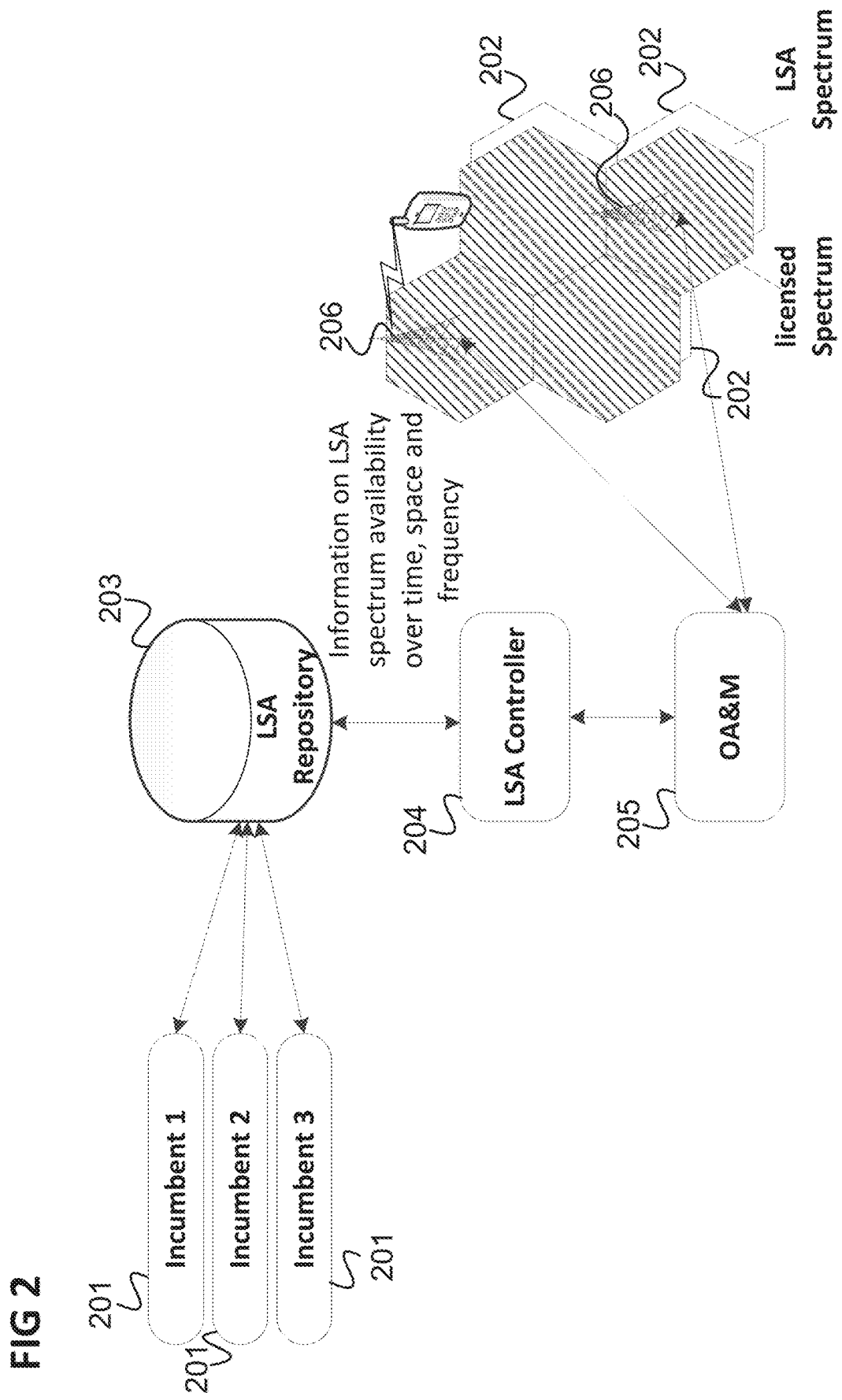
FIG. 2 illustrates LSA (Licensed Shared Access) for spectrum management.

In Europe, the so-called Licensed Shared Access (LSA) system is defined as illustrated in FIG. 2.

FIG. 2 illustrates LSA for spectrum management.

LSA allows the usage of occupied (but underused) bands by MNOs (Mobile Network Operators) on a Licensed Shared basis. I.e., incumbents 201 guarantee the availability of the spectrum for a given period of time, for a given geographic area as illustrated by radio cells 202 e.g. corresponding to radio cells 104 and a given spectrum band to a given MNO, typically for deploying LTE in this band, via an LSA repository 203. An LSA controller 204 accesses the LSA repository 203 and the MNO controls the communication network (e.g. base stations 206 operating radio cells 202) accordingly, as represented by an OA&M (Operation, Administration & Maintenance) 205. Thus, the MNO receives QoS guarantees and pays in return for the spectrum. In Europe, the current focus is on LTE TDD Band 20, i.e., 2.3-2.4 GHz. The radio cells 202, the base stations 206, the LSA controller 204 and the OA&M 205 can be seen to belong to a carrier domain and the incumbents 201 and the LSA repository 203 can be seen to an external domain.

In the following, approaches are described for extending the US Spectrum Access System (SAS) spectrum sharing, which have originally been designed for the US 3.5 GHz band, to other cases and scenarios. However, it should be noted that the approaches described in the following may analogously applied to an LSA system as illustrated in FIG. 2.

The main incumbents in the US 3.5 GHz are naval shipborne radar systems, but also satellite systems operating in the 3.5 GHz band. There are, however, satellite systems in spectrum above 3.7 GHz whose protection requirements have not yet been sufficiently considered. In the following approaches the protection of such satellite systems which may in particular operate in the C band (especially part of C-band above 3.7 GHz) and mmWave bands (also beyond the scope of the current SAS system). In particular, operation of NGSO (Non-Geostationary Orbited) satellite systems are considered which operate in lower orbits where they shift & drift compared to a given specific point on earth and the terrestrial systems see them as moving in the sky, i.e. the elevation angle to the satellite changes over time.

Figure 3:
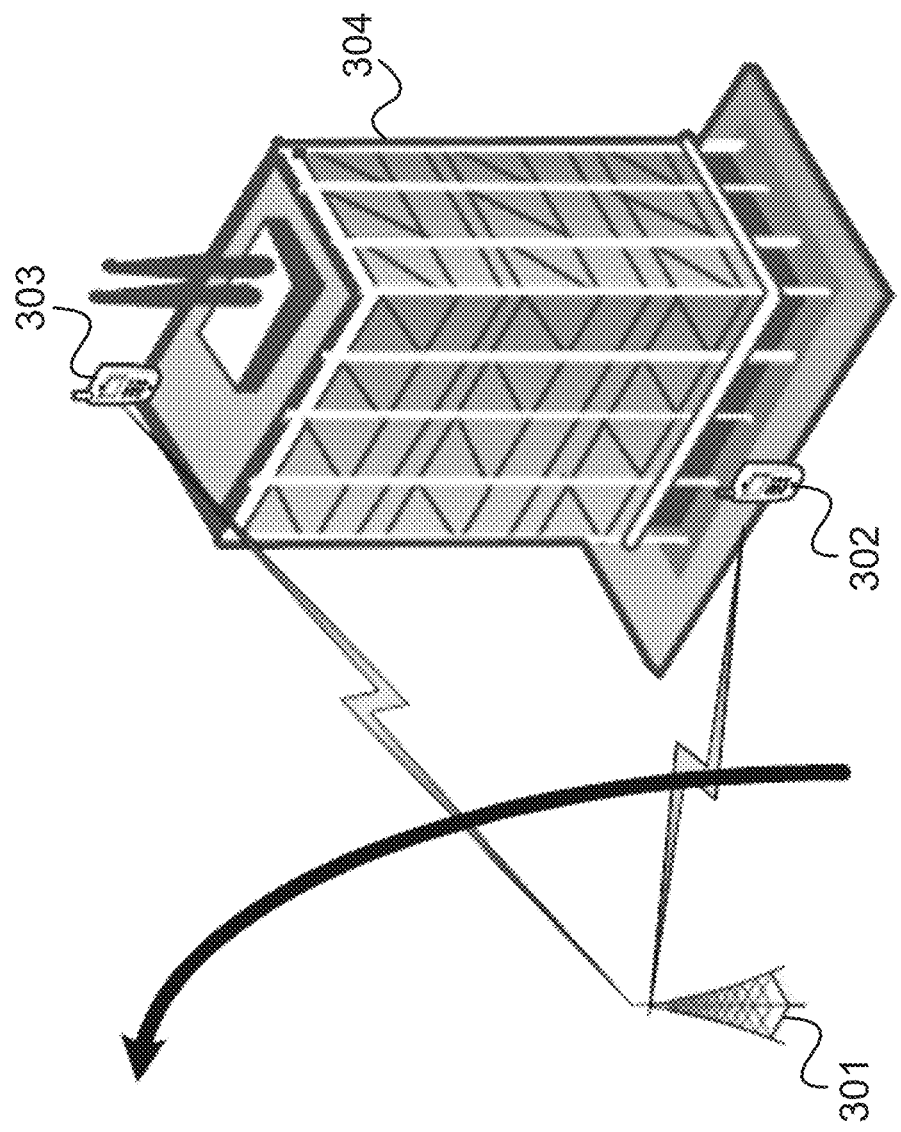
FIG. 3 illustrates communications at different elevation angles.

FIG. 3 illustrates communications at different elevation angles.

A base station 301 communicates with a first mobile terminal (e.g. User Equipment UE) 302 which is located on the ground and with a second mobile terminal 303 which is located on the top of a high building 304. Since the base station 301 is also located near ground, its communication with the first mobile terminal 302 has a low elevation angle and its (downlink) communication with the second mobile terminal 303 has a high elevation angle.

With an increased elevation angle (or with multipath-components of similar angles), the likelihood of interference to a satellite is increased due to the fact that blockage of radio signals by man-made structures reduces as elevation angle increases.

In the following, the question how to sufficiently detect Satellite systems in the presence of SAS spectrum sharing depending on the terrestrial transmission elevation angles (i.e., focusing of uplink/downlink of terrestrial communication causing interference to satellite space stations in the orbit and earth stations on the ground) can be seen to be addressed. Both cases of 1) Satellite downlink bands and 2) satellite uplink bands may be consider. Case 2) involves potential detection of certain elevation angles with the aim of reducing interference to a given satellite (i.e. satellite space station). Case 1) involves controlling emission of radio energy towards a satellite earth station (i.e. satellite ground station) at specified azimuth angles in the vicinity of a terrestrial station. These two cases may be considered and addressed separately.

Typically, while in 3.5 GHz SAS, incumbent shipborne radar is not able to provide any configuration information to a database while in the case of satellite systems at least the approximate position (and other parameters) are typically known. Orbital locations of satellite space stations, and all associated parameters, are registered in ITU-R (International Telecommunication Union, Radiocommunication Sector) databases and publicly available. Aside from bands used for satellite direct broadcasting to consumer residences, locations of earth stations (e.g. gateway stations) are also available in their registration data with regulators in each country and thus azimuth information towards the terrestrial mobile system could be obtained. In case of direct broadcast, addresses of such installations are available through subscription data for satellite TV receivers and could be used in coming up with azimuth information. According to various examples, this information is made available to the decision making process of a SAS system regarding control of usage of communication resources by user terminals 101.

In 3.5 GHz SAS, interference protection is typically handled from a 2D-perspective (azimuth-only). In the presence of satellite incumbents (in particular in the C band and mmWave bands), the elevation angle of emissions (or the angles of multipath-components) becomes important (e.g., from the ground to persons on top of a building). An approach according to various examples as described herein can be seen to be based on evolving (legacy) 2D SAS to 3D SAS (which takes into account both azimuth angle and elevation angle). Specifically, multiple antenna array beamforming could be used to facilitate this evolution to 3D SAS.

The evolving of a 2D SAS system to a 3D SAS system for example includes
1. Adding a database functionality
2. Adding elevation angle data
3. Use azimuth data for null-steering, if necessary These are described in more detail in the following.

Figure 4:
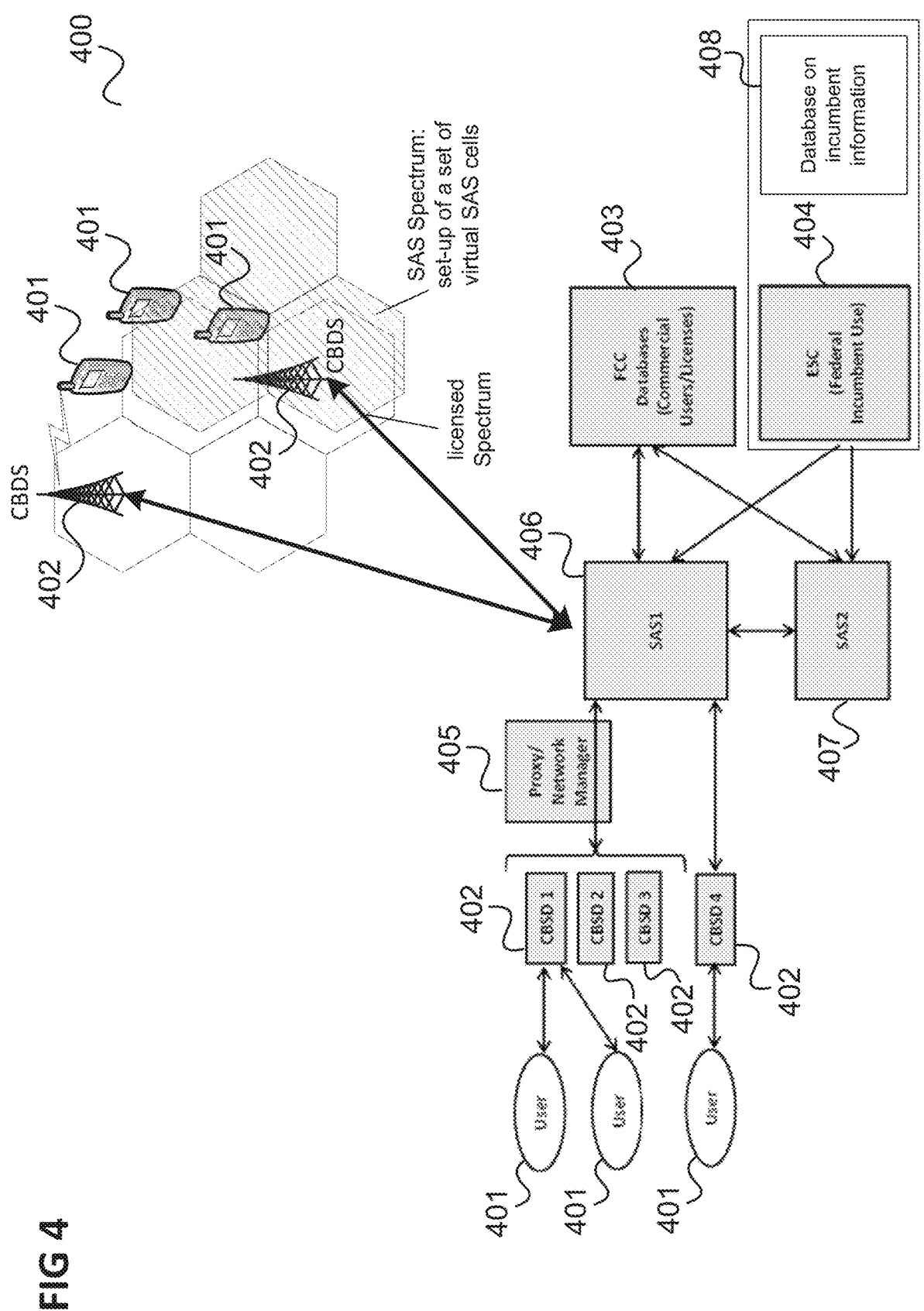
FIG. 4 shows a communication system having the FCC Spectrum Access System (SAS) Architecture with an added database functionality.

FIG. 4 shows a communication system 400 having the FCC Spectrum Access System (SAS) Architecture with an added database functionality.

Similarly to the communication system 100, the communication system 400 includes user terminals 401, CBSDs 402, an FCC database 403, an ESC 404, a proxy 405 and SAS controllers 406, 407.

In addition, the communication system 400 includes a database component 408 which may for example include additional information on presence of one or more incumbent satellites or other incumbent communication devices, such as (approximate) position, interference requirements, coverage, etc.

A SAS controller 406, 407 may detect the presence of an incumbent satellite based on accessing the database 408. Thus, the ESC 404 and the database 408 may be connected an information fusion circuitry which may be included such that the SAS controllers 406, 407 may receive combined information for both azimuth angle and elevation angle.

Alternatively, the database 408 may be connected to the SAS nodes (i.e. SAS controllers) 406, 407 themselves and the data fusion (e.g. combination of azimuth angle and elevation angle of an incumbent satellite to determine whether it may be affected by a communication) is handled inside the SAS nodes 406, 407.

Figure 5:
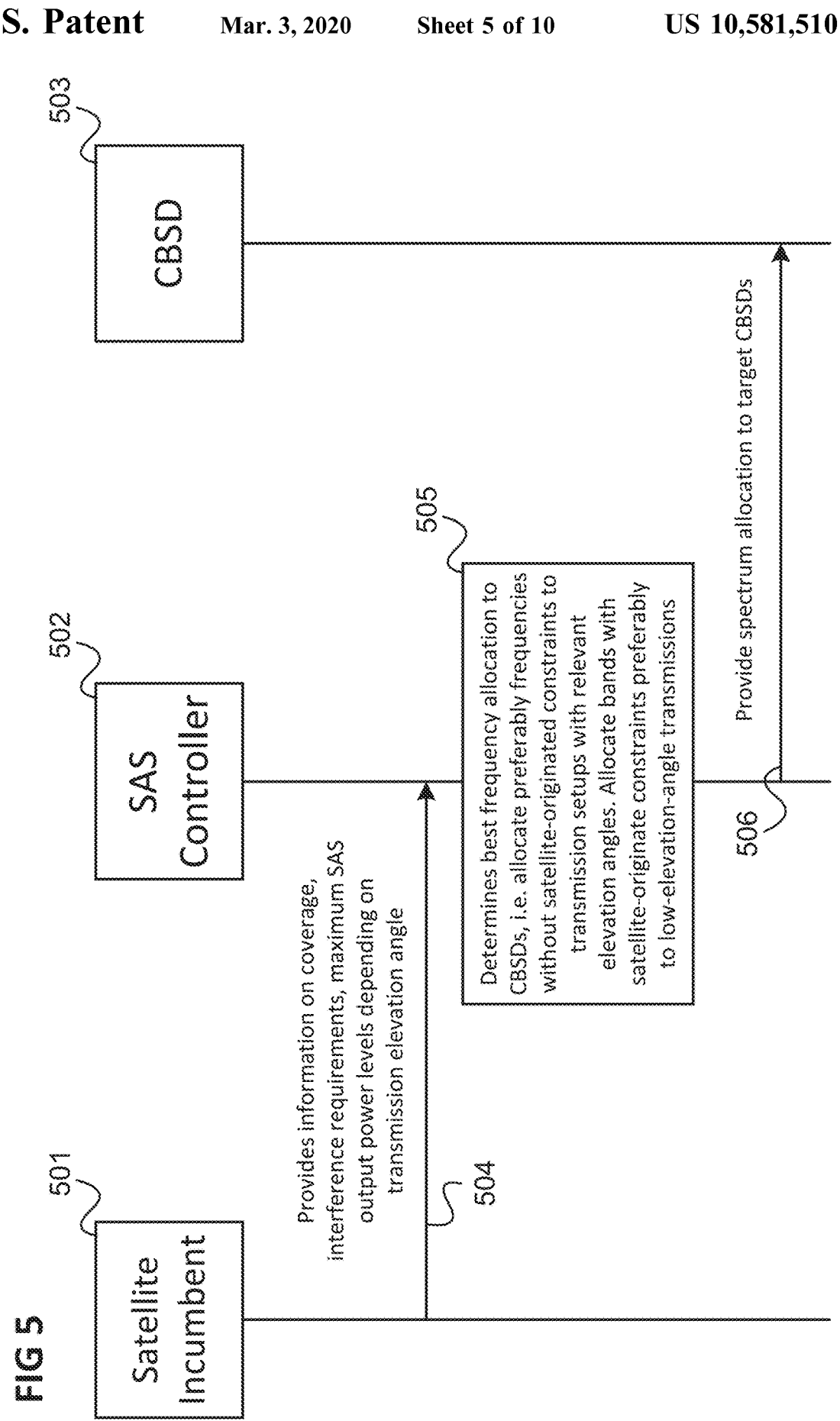
FIG. 5 shows a flow diagram according to an example of a process of feeding information about a satellite incumbent to a SAS system.

FIG. 5 shows a flow diagram 500 according to an example of a process of feeding information about a satellite incumbent to a SAS system.

The flow takes place between a satellite incumbent 501, a SAS controller 502 and a CBSD 503.

In 504, the satellite incumbent 501 provides information on its coverage, interference requirements and maximum SAS output power levels depending on transmission elevation angle.

In 505, the SAS controller 502 determines a suitable frequency (spectrum) allocation for the CBSD 503, i.e. an allocation of preferred frequencies without satellite-originated constraints to transmission setups with relevant elevation angles. The SAS controller 502 for example allocates bands with satellite-originated constraints to low-elevation-angle transmissions.

In 506, the SAS controller 502 provides the determined spectrum allocation to the CBSD.

Figure 6:
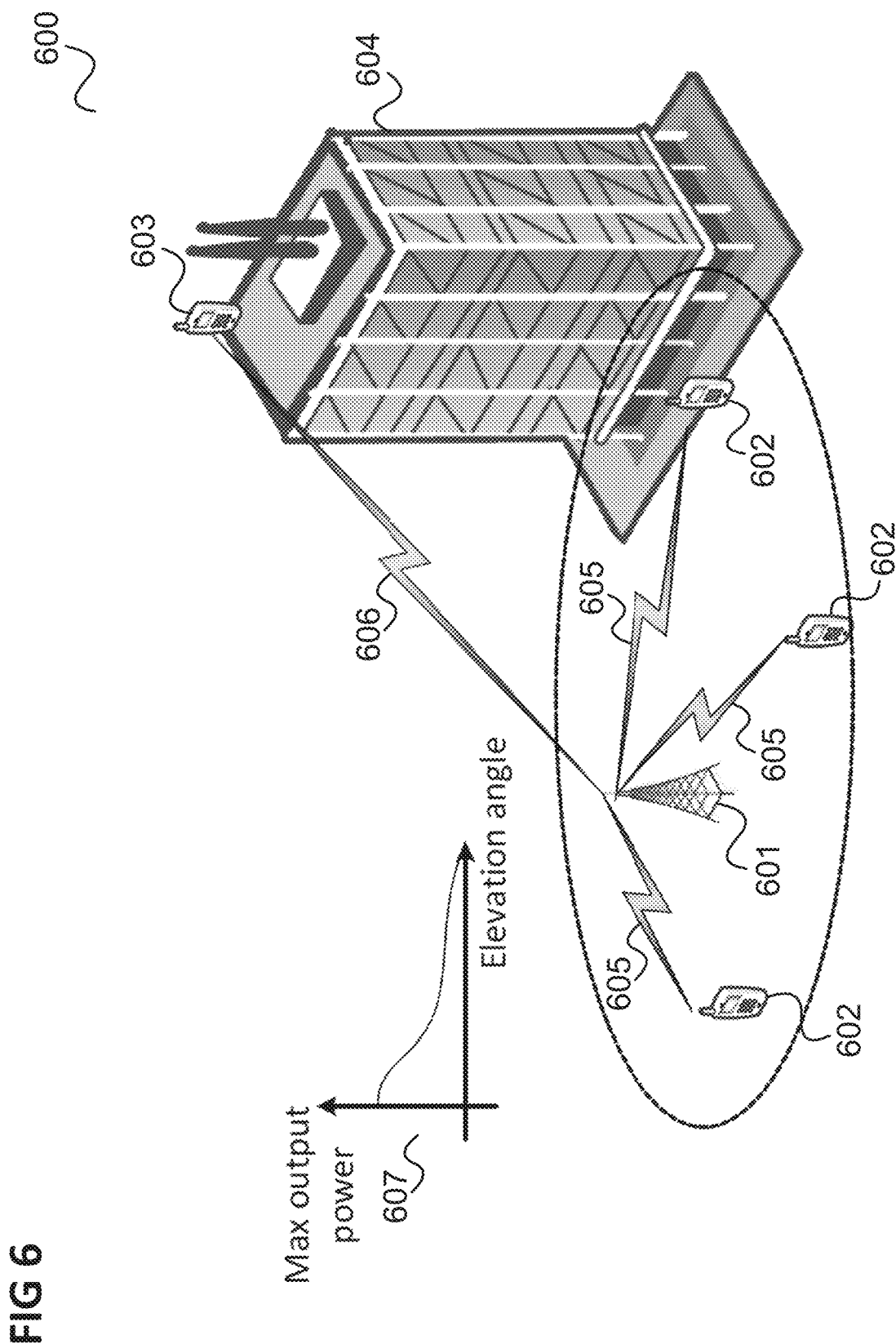
FIG. 6 shows a communication arrangement illustrating the consideration of elevation angle data in spectrum allocation.

FIG. 6 shows a communication arrangement 600 illustrating the consideration of elevation angle data in spectrum allocation.

A base station 601 communicates with a three mobile terminals 602 which are located on the ground and with a fourth mobile terminal 603 which is located on the top of a high building 604. Since the base station 601 is also located near ground, its communications 605 with the mobile terminals 602 on ground have a low elevation angle and its (downlink) communication 606 with the second mobile terminal 603 (i.e. downlink transmission to the second mobile terminal 603) has a high elevation angle.

According to various examples, a SAS controller 406, 407 allocates channels not used by satellite uplink, or immediately adjacent (in terms of frequency) to those used by satellite uplink to those base station transmissions requiring high elevation angles (or high elevation angles of multipath-components) in order to minimize the impact onto the satellite incumbents. In the example of FIG. 6, this is the case for downlink communication 606 with the fourth mobile terminal 603, i.e. for a transmission to the fourth mobile terminal 603.

In other words, a SAS controller 406, 407 may perform spectrum allocation for a communication by a CBSD (such as base station 601) based on the principle that sharing of satellite bands is to be avoided for high-elevation angle transmissions (e.g. for downlink communication with the fourth mobile terminal 603). For such a communication, the SAS controller 406, 407 may (as far as possible) allocate communication resources of a non-satellite band (i.e. a band not used by an incumbent satellite).

The mobile terminals 602 located near ground with low elevation angles of the communications 605 with the base station 601 (in both uplink and downlink) may use satellite bands since these communications 605 typically have low impact on a satellite. The SAS controller 406, 407 may thus allocated a satellite band (i.e. a band used by an incumbent satellite) for a transmission to a mobile terminal located at a low elevation from a CBSD.

Typically, transmitters located on the ground transmitting to receivers at the same elevation (i.e. the same altitude) are creating only limited Line-of-Sight (LOS) interference, however multipath component interference may come into play which may be derived from channel measurements. The higher the receiver is positioned, i.e. the higher the elevation angle of the transmission is, the more LOS interference is typically generated to satellite space station receivers. While a SAS controller 406, 407 generally tries to allocate non-satellite (shared) bands to (LOS or multipath-component) high-elevation-angle transmissions, this set-up may not always be possible.

In case that a SAS controller 406, 407 is unable to allocate a non-satellite band to a (LOS or multipath-component) high-elevation angle transmission in the direction of an existing GSO or NGSO satellite (whose presence the SAS controller 406, 407 may determine based on the database information) interference to the satellite space station may arise. To keep this interference limited, the SAS controller 406, 407 may require the transmitter to use a reduced transmission power level. Generally, as illustrated by the diagram 607 included in FIG. 6, a high elevation-angle transmission may require a reduction of emission power maximum output (transmission) power level (e.g. depending on whether a satellite is present or is present in a certain region lying in the direction of the transmission). The SAS controller 406, 407 may still allow transmitters to use the highest emission power levels (as far as allowed by possible other constraints) for low-elevation angle transmissions.

Figure 7:
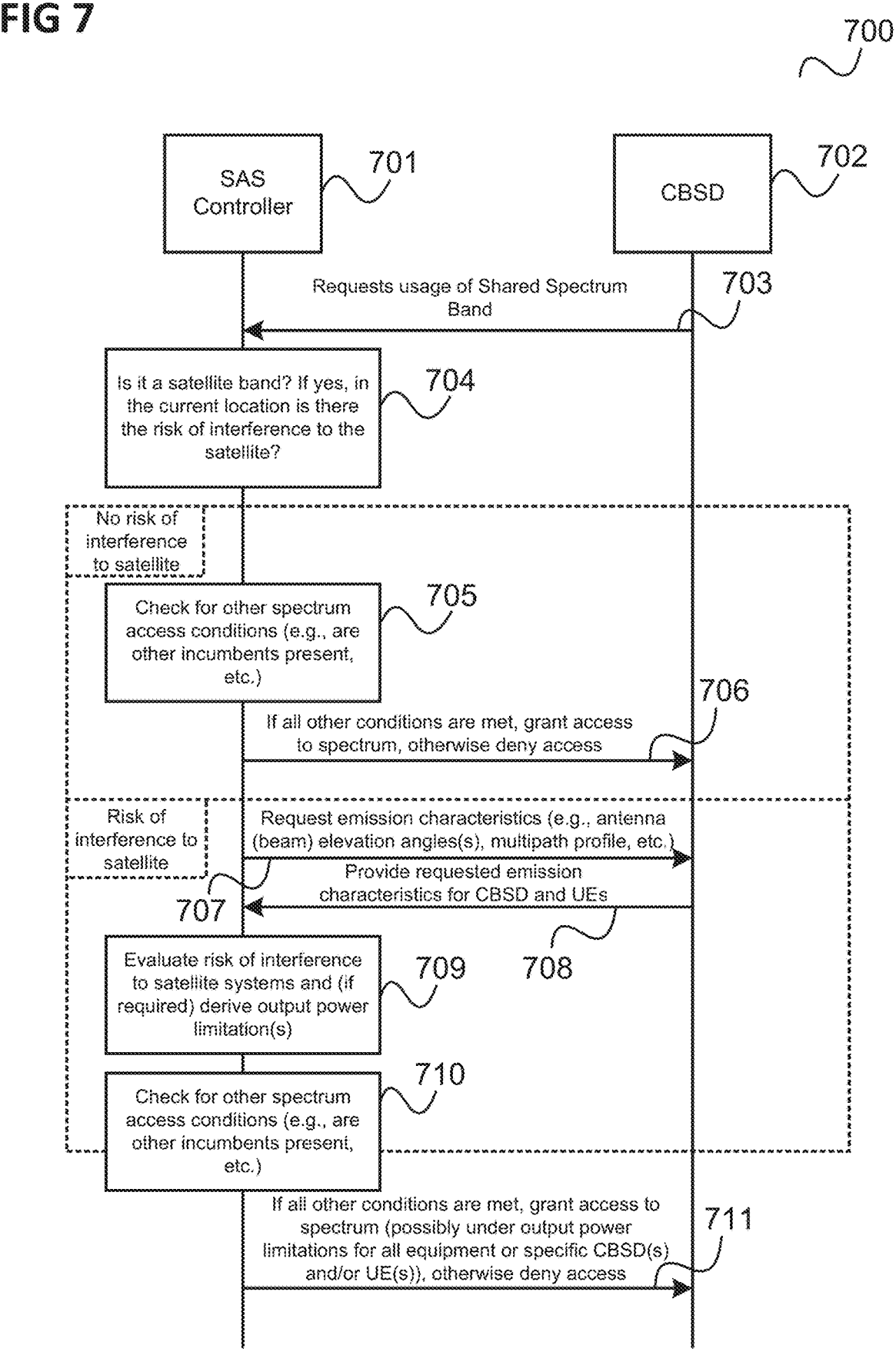
FIG. 7 shows a flow diagram illustrating an example for a derivation of an allocation of the modified output power of a terrestrial station (e.g. CBSD or mobile terminal).

FIG. 7 shows a flow diagram 700 illustrating an example for a derivation of an allocation of the modified output power of a terrestrial station (e.g. CBSD or mobile terminal).

The flow takes place between a SAS controller 701 and a CBSD 702.

In 703, the CBSD 702 requests usage of a shared spectrum band, i.e. a frequency band which is licensed for incumbent users.

In 704, the SAS controller 701 determines whether the band is a satellite band. If this is the case, the SAS controller 702 determines whether depending on the current location of a satellite and of the CBSD 702 and its communication partner (e.g. mobile terminal with which the CBSD 702 intends to communicate using the band) there is a risk of interference to the satellite.

If there is no risk of interference to a satellite (since the band is not a satellite band or according to the current location of the satellite, CBSD and its communication partner) the SAS controller 701, in 705, checks other possible spectrum access conditions (e.g. whether there are other (non-satellite) incumbents present etc.).

In 706, if all spectrum access conditions are met, the SAS controller 701 grants the CBSD 702 access to the spectrum. Otherwise, it denies access.

If there is a risk of interference with a satellite the SAS controller 701 the SAS controller 701 requests, in 707, emission characteristics (related to the intended communication) such as an antenna (beam) elevation angle, a multipath profile etc.

In 708, the CBSD 702 provides the requested emission characteristics, e.g. for itself and one or more mobile terminals with which it intends to communicate.

In 709, the SAS controller 701 evaluates the risk of interference to satellites based on the emission characteristics and (if required) derives a output power limitation or output power limitations based on the evaluated risk.

In 710, the SAS controller 701 checks other possible spectrum access conditions (e.g. whether there are other (non-satellite) incumbents present etc.).

In 711, if all the other spectrum access conditions are met, the SAS controller 701 grants the CBSD 702 access to the spectrum (possibly under general output power limitations (applicable for multiple transmitters) specifically for the CBSD 702 and/or one or more mobile terminals).

While reducing output power along certain elevation angles might come at the expense of lower performance of the terrestrial network, it facilitates sharing of a frequency band with satellites which the terrestrial network might otherwise not be allowed to use at all.

It should be noted that in case of operation of mobile terrestrial system in, or adjacent to, bands operated by satellite downlink receivers (earth stations), an approach similar to above could be used by incorporating azimuth information (i.e. azimuth angle data) instead of the elevation and the above process could be repeated. The difference would be instead of capping the terrestrial station output power, a null would be steered in the direction of the victim earth station in order to reduce effective radiation in that azimuth. It should be noted that null-steering comes at the expense of lower performance of the terrestrial network. However, it facilitates sharing of a frequency band with satellites which the terrestrial network might otherwise not be allowed to use at all.

Since satellite systems generally operate their uplink and downlink on different, often well far-apart, frequencies, implementation of a 3D SAS utilizing both azimuth and elevation can be expected to not unduly degrade the terrestrial system performance on either of the bands. Optionally, a SAS controller could monitor network data (e.g. through received information from CBSD) and limit operation in the shared band based on a set of pre-defined network performance metrics, e.g. average user throughput, and vacate the band if protection of the satellite incumbents is violating those metrics.

FIG. 8 illustrates 3-D spectrum sharing in comparison to 2-D spectrum sharing.

A first diagram 801 illustrates a 2-D spectrum sharing approach of systems such as Licensed Shared Access (LSA), Citizen Broadband Radio System (CBRS)/Spectrum Access System (SAS) etc. For CBRS/SAS, spectrum is allocated to so-called "Census Tracts" 803, typically on a 2-D basis.

A second diagram 802 illustrates 3-D spectrum sharing which may define 3-D boxes 804 (or any other 3-D shape) which may for example be auctioned independently. A satellite or drone etc. may thus operate within a given spatial block 804 with guaranteed interference limits being implemented.

Each of the boxes 804 may be assigned to one or multiple drones, satellites or other devices such that they can move in the assigned space while maximum interference levels are being guaranteed. Also, in such a 3-D case, stations on the ground may prefer to go towards 3-D auctioning in order to be certain that no interference is coming from above (or from below).

Furthermore, this allocated 3-D shaped space 804 may move over time. A satellite for example moves and the corresponding allocation space may be defined in such a way that it follows the movement of the satellite (e.g., the satellite may always be in the middle of the 3-D shaped space 804 within which the maximum interference levels are being defined, typically following an auctioning process or similar). Similar, in case of a Drone or a Drone Swarm (each 3-D shaped space 804 covering a single, multiple or all Drones) the 3-D shaped box 804 (and thus the space for which a maximum interference level is being defined) may move with the movement of the Drone(s) (swarm).

For CBRS/SAS, this approach is valid for PAL (Priority Access License) and GM (General Authorized Access) Users.

Typically, if previously a 2-D license (typically on the ground) was acquired and the system moves to 3-D license granting (as illustrated above), the ground-systems will typically get a 3-D shaped space over which the interference level is guaranteed. In this way, the ground system will be protected from stations above (or possibly below) that may create additional interference.

Figure 9:
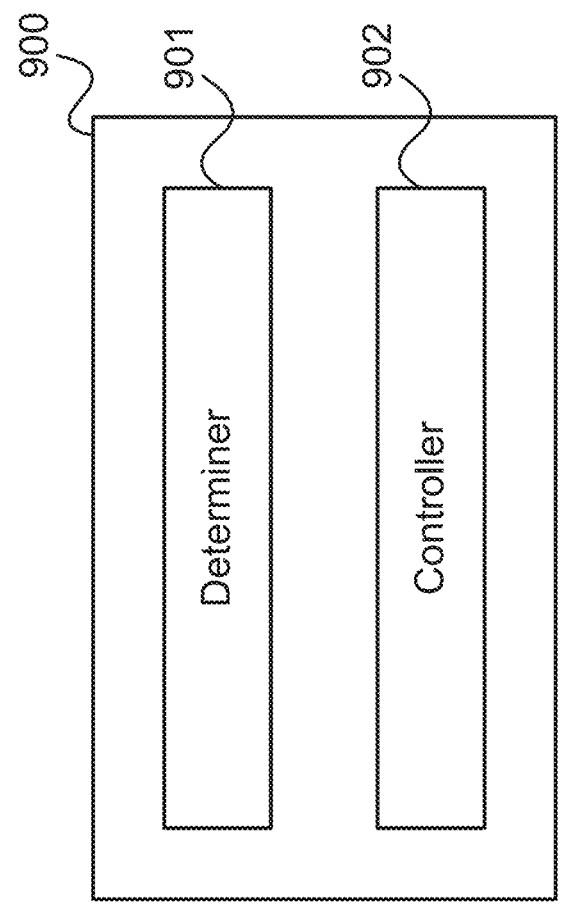
FIG. 9 shows a network controller.

In summary, according to various examples, a network controller is provided as illustrated in FIG. 9.

FIG. 9 shows a network controller 900.

The network controller 900 includes a determiner 901 configured to determine, based on an elevation angle of a direction of a communication between a first communication device and a second communication device, a risk of interference to a third communication device by the communication.

The network controller 900 further includes a controller 902 configured to control the communication between the first communication device and the second communication device based on the determined risk.

According to various examples, in other words, an elevation angle of a direction of a communication between a first communication device and a second communication device, e.g. of a transmission of the first communication device to the second communication device, is considered by a controlling entity (implemented by a network component, i.e. a network controller) which is configured to control communication between the first communication device and the second communication device, e.g. to control communication resource usage by the first communication device and the second communication device for the communication (e.g. a SAS controller).

The risk of interference may for example include a deterministic measure of instantaneous (e.g. maximum) interference, a statistical (e.g. average or maximum) interference, or similar. The risk of interference may also include a measure of a probability that interference is above a predetermined interference threshold wherein the interference threshold is for example an allowed maximum interference (e.g. as it is allowed according to regulations for spectrum usage) and is for example defined such that if interference is above the interference threshold, a degradation of communication by the third communication device due to the interference exceeds an allowed degradation. The risk of interference may correspond to interference thresholds defined according to regulations for spectrum sharing.

The network controller 900 may determine the elevation angle of the direction based on information provided by the first communication device and the second communication device or both. The first communication device and the second communication device may for example have knowledge about the communication direction since they may for example apply beamforming for communication. For example, they may operate according to a 5G system which applies beamforming. The first communication device and the second communication device may provide information about the communication direction, e.g. the elevation angle itself, to the network controller. The network controller may then evaluate whether the communication direction points to a region (possibly taking into account multipathing) where a communication may cause interference to the third communication device (e.g. a satellite). The network controller may also apply simple criteria such as an elevation threshold according to which the first communication device and the second communication device may not use a satellite band (or generally a frequency band used by the third communication device) if the elevation angle of the communication direction is above the threshold. Alternatively or in addition, the network controller may require a reduction of transmission power the higher the elevation angle is (e.g. a reduction by a certain percentage when the elevation angle is above the threshold).

According to various examples, an elevation angle is taken into account when evaluating a risk of interference from the communication to one or more other (third) communication devices. In particular, a high elevation angle may increase the risk of interference to a satellite.

Thus, the approach of FIG. 9 allows protection of a satellite from interference. The approach may also take advantage of the nature of upcoming 5G system which includes multiple antenna arrays and thus for example transmissions which high directivity.

An approach according to various examples may include one or more of the following:
- including in a SAS system a database which includes information on incumbent users and complements a sensing system;
- considering the elevation angle of a transmitter (and angles of related multipath components); for example, with an increase of the elevation angle, the maximum emission power levels are reduced;
- using beamforming and null-steering to evolve SAS to cover 3-dimensional space.

The first communication device or the second communication device may for example be a communication terminal, for example be a portable phone, and may include typical communication terminal components such as a transceiver, an antenna, a subscriber identity module, an application processor, a memory, a display, a battery, a speaker, a microphone etc. The other one of the first communication device or the second communication device is for example a radio access node such as a base station or an access point, i.e. a CBSD according to SAS terminology.

The network controller (e.g. the determiner and the controller) may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The network controller may include circuitry to control the communication, e.g. for sending a control message to the first communication device or the second communication device or both. The circuitry may control the first communication device or the second communication device or both using wired or wireless communication. For example, the network controller controls a base station (corresponding to the first communication device or the second communication device) by means of the base station's connection to other components of a radio access network or of a mobile radio communication network.

FIG. 10 shows a flow diagram 1000 illustrating a method for controlling a communication, for example performed by a network controller.

In 1001, the network controller determines, based on an elevation angle of a direction of a communication between a first communication device and a second communication device, a risk of interference to a third communication device by the communication.

In 1002, the network controller controls the communication between the first communication device and the second communication device based on the determined risk.

The following examples pertain to further exemplary implementations.

Example 1 is a network controller as illustrated in FIG. 9.

In Example 2, the subject-matter of Example 1 may optionally include controlling the communication comprising setting at least one communication parameter of the communication.

In Example 3, the subject-matter of Example 2 may optionally include the communication parameter being transmission power or used frequency.

In Example 4, the subject-matter of any one of Examples 1-3 may optionally include the determiner being configured to determine the risk of interference to be the higher as the elevation angle is higher.

In Example 5, the subject-matter of any one of Examples 1-4 may optionally include the controller being configured to set a transmission power of the communication the lower as the risk of interference is lower.

In Example 6, the subject-matter of any one of Examples 1-5 may optionally include the controller being configured to set a frequency range of the communication different from a frequency range used by the third communication device based on whether the risk of interference being above a predetermined threshold.

In Example 7, the subject-matter of any one of Examples 1-6 may optionally include the determiner being configured to determine the risk based on information about a location of the third communication device.

In Example 8, the subject-matter of any one of Examples 1-7 may optionally include the determiner being configured to determine the risk based on whether the elevation angle of the direction of the communication is pointing the communication direction, from the first communication device, to a location of the second communication device.

In Example 9, the subject-matter of any one of Examples 1-8 may optionally include the third communication device being a flying communication device.

In Example 10, the subject-matter of any one of Examples 1-9 may optionally include the third communication device being a satellite.

In Example 11, the subject-matter of any one of Examples 1-10 may optionally include the first communication device being a base station and the second communication device being a communication terminal or the first communication device being a communication terminal and the second communication device being a base station.

In Example 12, the subject-matter of any one of Examples 1-11 may optionally include the communication being a communication in a frequency spectrum used by the third communication device.

In Example 13, the subject-matter of any one of Examples 1-12 may optionally include the determiner being configured to determine the risk of interference based on information about the surroundings of the first communication device and the second communication device.

In Example 14, the subject-matter of any one of Examples 1-13 may optionally include the determiner being configured to determine the risk of interference based on information about presence or size of buildings in the vicinity of the first communication device and the second communication device.

In Example 15, the subject-matter of Example 14 may optionally include the determiner being configured to determine the risk of interference to be the higher, when there are more buildings in the vicinity of the first communication device and the second communication device.

In Example 16, the subject-matter of any one of Examples 1-15 may optionally include the controller being configured to control the communication by transmitting a control message to the first communication device or the second communication device.

In Example 17, the subject-matter of any one of Examples 1-16 may optionally include the determiner being configured to determine the risk of interference based on both the elevation angle of the direction of the communication and an azimuth angle of the direction of the communication.

In Example 18, the subject-matter of any one of Examples 1-17 may optionally include the communication being transmitted by beamforming.

In Example 19, the subject-matter of any one of Examples 1-18 may optionally include a database configured to store information about the presence of the third communication device.

Example 20 is a method for controlling a communication as illustrated in FIG. 10.

In Example 21, the subject-matter of Example 20 may optionally include controlling the communication comprising setting at least one communication parameter of the communication.

In Example 22, the subject-matter of Example 21 may optionally include the communication parameter being transmission power or used frequency.

In Example 23, the subject-matter of any one of Examples 20-22 may optionally include determining the risk of interference to be the higher as the elevation angle is higher.

In Example 24, the subject-matter of any one of Examples 20-23 may optionally include controlling the communication comprising setting a transmission power of the communication the lower as the risk of interference is lower.

In Example 25, the subject-matter of any one of Examples 20-24 may optionally include controlling the communication comprising setting a frequency range of the communication to be different from a frequency range used by the third communication device based on whether the risk of interference being above a predetermined threshold.

In Example 26, the subject-matter of any one of Examples 20-25 may optionally include determining the risk based on information about a location of the third communication device.

In Example 27, the subject-matter of any one of Examples 20-26 may optionally include determining the risk based on whether the elevation angle of the direction of the communication is pointing the communication direction, from the first communication device, to a location of the second communication device.

In Example 28, the subject-matter of any one of Examples 20-27 may optionally include the third communication device being a flying communication device.

In Example 29, the subject-matter of any one of Examples 20-28 may optionally include the third communication device being a satellite.

In Example 30, the subject-matter of any one of Examples 20-29 may optionally include the first communication device being a base station and the second communication device being a communication terminal or the first communication device being a communication terminal and the second communication device being a base station.

In Example 31, the subject-matter of any one of Examples 20-30 may optionally include the communication being a communication in a frequency spectrum used by the third communication device.

In Example 32, the subject-matter of any one of Examples 20-31 may optionally include determining the risk of interference based on information about the surroundings of the first communication device and the second communication device.

In Example 33, the subject-matter of any one of Examples 20-32 may optionally include determining the risk of interference based on information about presence or size of buildings in the vicinity of the first communication device and the second communication device.

In Example 34, the subject-matter of Example 33 may optionally include determining the risk of interference to be the higher when there are more buildings in the vicinity of the first communication device and the second communication device.

In Example 35, the subject-matter of any one of Examples 20-34 may optionally include controlling the communication by transmitting a control message to the first communication device or the second communication device.

In Example 36, the subject-matter of any one of Examples 20-35 may optionally include determining the risk of interference based on both the elevation angle of the direction of the communication and an azimuth angle of the direction of the communication.

In Example 37, the subject-matter of any one of Examples 20-36 may optionally include the communication being transmitted by beamforming.

In Example 38, the subject-matter of any one of Examples 20-37 may optionally include storing information about the presence of the third communication device.

According to a further example, possible interference of a communication to a satellite system is identified by applying the transmission angles and the respective multi-path components and identifying whether it is in the direction towards the satellite system (e.g. an satellite earth station or a satellite (located in space)).

According to a further example, a reduction of output power is enforced (e.g. by a SAS controller) to those CBSDs (and related UEs) which are creating interference to a satellite system by either directly lowering the power or steering a null in the direction of the satellite system.

According to a further example, information is between CBSD and SAS on the characteristics of interference and systems involved.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:
1. A network controller comprising:
a determiner configured to determine, based on an elevation angle of a direction of a communication from a first communication device to a second communication device, a risk of interference to a third communication device by the communication; and a controller configured to control the communication from the first communication device to the second communication device when the determined risk exceeds a predetermined risk threshold, wherein the determined risk exceeds the predetermined risk threshold when the elevation angle of the direction of the communication is larger than a predetermined elevation angle threshold, wherein the controller controls the communication by reducing a transmission power of the communication in the direction of the communication by a percentage, wherein the percentage of reduction increases the higher the elevation angle is.

2. The network controller of claim 1, wherein the determiner is configured to determine the risk of interference to be the higher, as the elevation angle is higher.

3. The network controller of claim 1, wherein the controller is configured to set reduce the transmission power of the communication in the direction of the communication to be lower but not zero, as the determined risk of interference increases.

4. The network controller of claim 1, wherein a frequency range used by the third communication device comprises a first frequency range, wherein the controller sets the transmission frequency range of the communication to a second frequency range different from the first frequency range.

5. The network controller of claim 4, wherein the first frequency range and the second frequency range do not overlap.

6. The network controller of claim 1, wherein the determiner is configured to determine the risk based on information about a location of the third communication device, wherein the determined risk exceeds the predetermined risk threshold further comprises when the third communication device is determined to be in a region in the direction of the communication.

7. The network controller of claim 1, wherein the determiner is configured to determine the risk based on whether the elevation angle of the direction of the communication from the first communication device to the second communication device is pointing to a region where the communication can cause intereference with the third communication device.

8. The network controller of claim 1, wherein the third communication device is a flying communication device or a satellite.

9. The network controller of claim 1, wherein the first communication device is a base station and the second communication device is a communication terminal or the first communication device is a communication terminal and the second communication device is a base station.

10. The network controller of claim 1, wherein the determiner is configured to determine the risk of interference based on information about the surroundings of the first communication device and the second communication device.

11. The network controller of claim 1, wherein the determiner is configured to determine the risk of interference based on information about presence or size of buildings in the vicinity of the first communication device and the second communication device.

12. The network controller of claim 11, wherein the determiner is configured to determine the risk of interference to be the higher, when there are more buildings in the vicinity of the first communication device and the second communication device.

13. The network controller of claim 1, wherein the controller is configured to control the communication by transmitting a control message to the first communication device or the second communication device.

14. The network controller of claim 1, wherein the determiner is configured to determine the risk of interference based on both the elevation angle of the direction of the communication and an azimuth angle of the direction of the communication.

15. The network controller of claim 1, wherein the communication is transmitted by beamforming.

16. The network controller of claim 1, comprising a database configured to store information about the presence of the third communication device.

17. The network controller of claim 1, wherein the controller is configured to control the communication by changing the transmission frequency range of the communication in the direction of the communication when the elevation angle of the direction of the communication exceeds the predetermined elevation angle threshold.

18. A method for controlling a communication comprising:

determining, based on an elevation angle of a direction of a communication from a first communication device to a second communication device, a risk of interference to a third communication device by the communication; and controlling the communication from the first communication device to the second communication device when the determined risk exceeds a predetermined risk threshold, wherein the determined risk exceeds the predetermined risk threshold when the elevation angle of the direction of the communication is larger than a predetermined elevation angle threshold wherein controlling the communication from the first communication device to the second communication device comprises reducing a transmission power of the communication in the direction of the communication by a percentage, wherein the percentage of reduction increases the higher the elevation angle is.

* * * * *